Sept. 13, 1960 K. H. KOEHNE 2,952,155
LIQUID LEVEL GAUGING APPARATUS
Filed Aug. 20, 1958 3 Sheets-Sheet 1
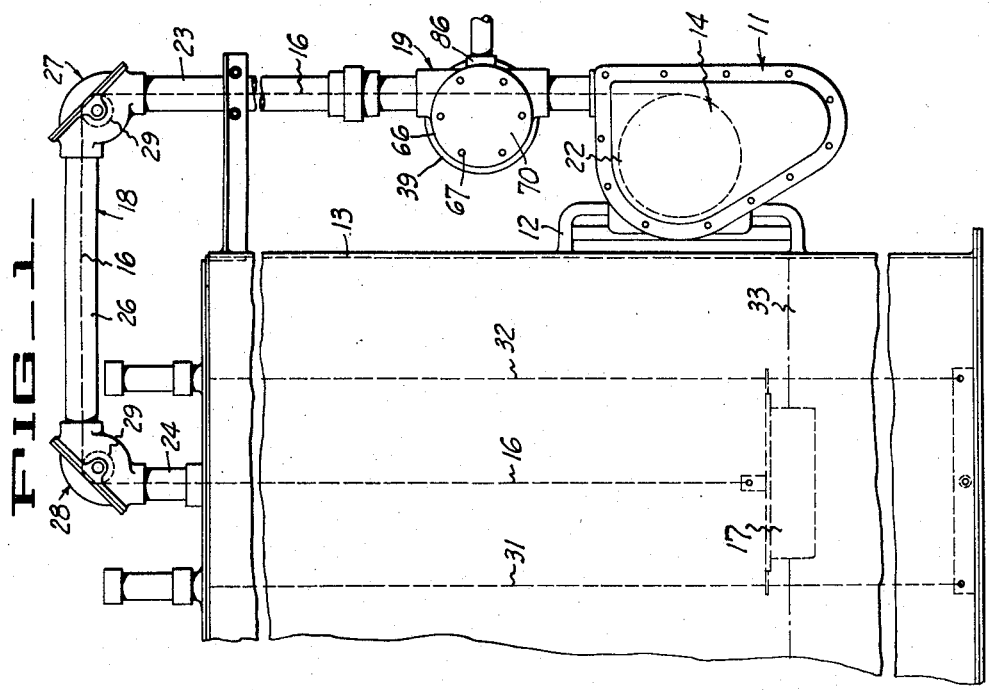
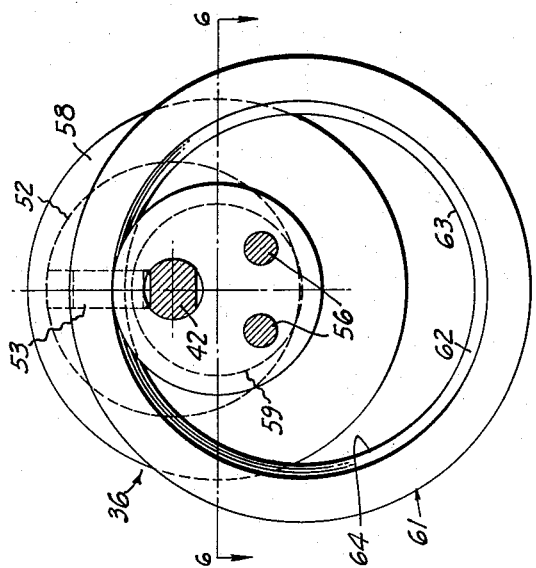
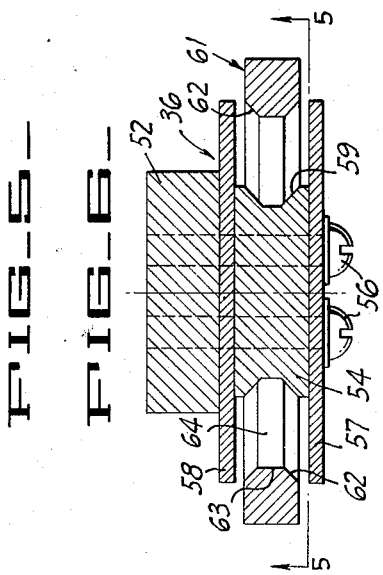
INVENTOR.
Karl H. Koehne
BY
ATTORNEYS

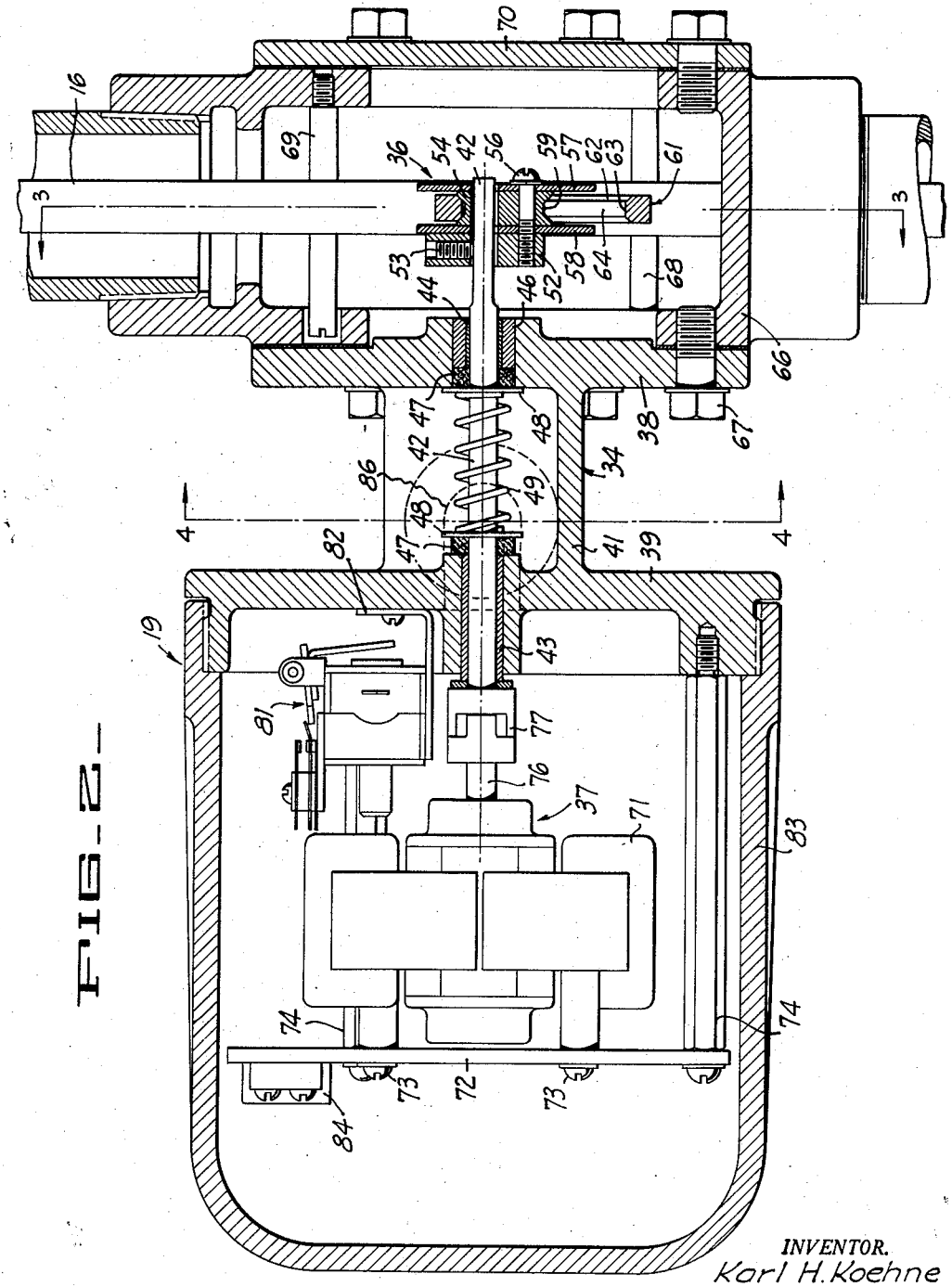

Sept. 13, 1960  K. H. KOEHNE  2,952,155
LIQUID LEVEL GAUGING APPARATUS
Filed Aug. 20, 1958  3 Sheets-Sheet 3
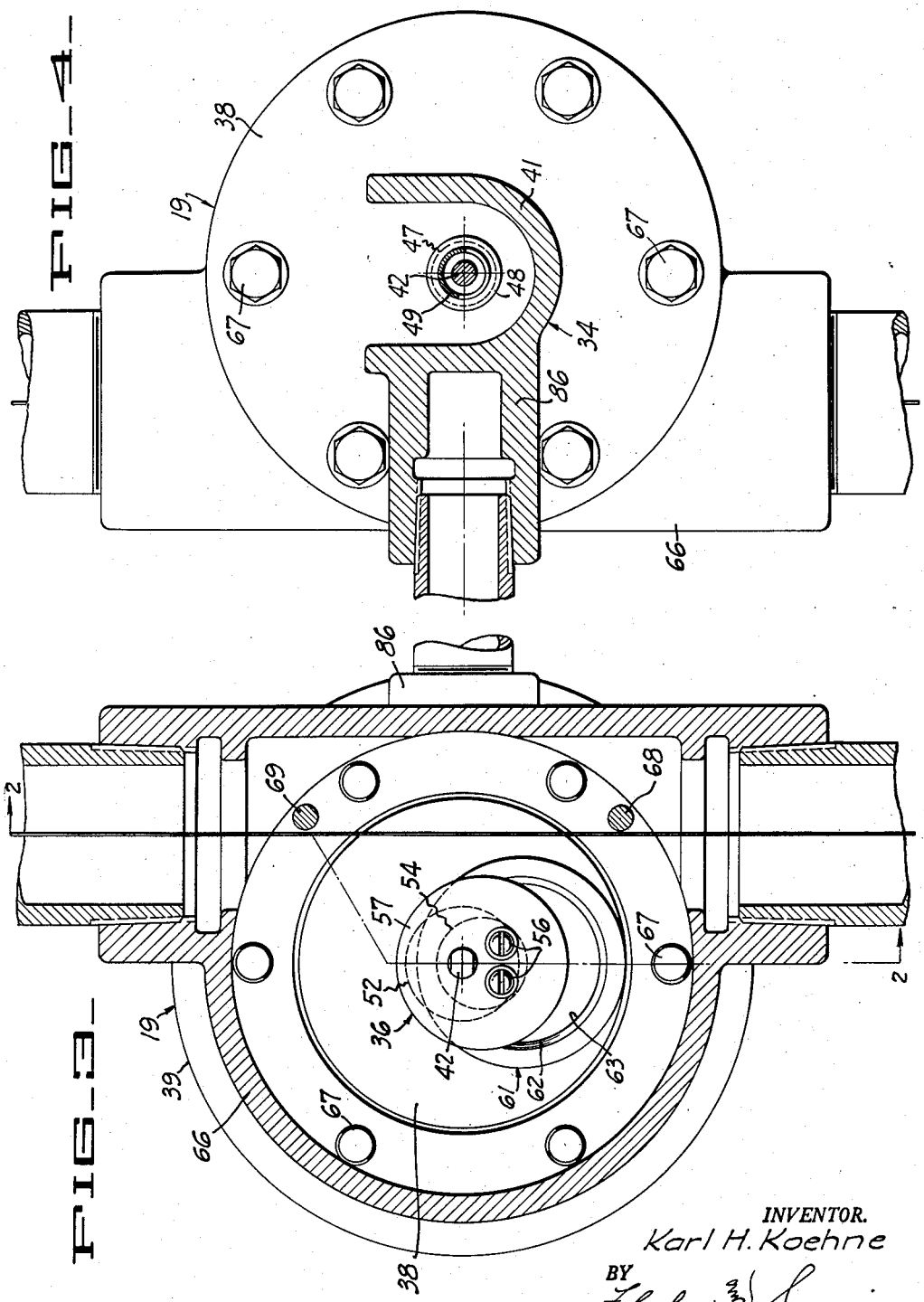
INVENTOR.
Karl H. Koehne
BY
ATTORNEYS ns # United States Patent Office 2,952,155
Patented Sept. 13, 1960

2,952,155

LIQUID LEVEL GAUGING APPARATUS

Karl H. Koehne, San Francisco, Calif., assignor to Shand and Jurs Co., Berkeley, Calif., a corporation of California Filed Aug. 20, 1958, Ser. No. 756,100

6 Claims. (Cl. 73—321)

This application relates generally to liquid level gauging apparatus.

In my co-pending application, Serial No. 705,203, filed December 26, 1957, I have disclosed a gauging apparatus which utilizes means for overcoming any friction which inhibits free movement of the gauging tape. The friction is overcome by inducing recurrent movements or vibrations in the tape. The particular magnetically operated apparatus disclosed in the application for introducing these recurrent movements into the tape has been found to operate very satisfactorily. However, there is still a need for apparatus for introducing such recurrent movements or vibrations in the tape which is relatively inexpensive and easy to manufacture and which can be utilized for introducing strong recurrent movements or vibrations in the tape. There is also a need for an apparatus of this type in which the amplitude of movement induced into the tape can be readily changed.

In general, it is an object of the present invention to provide an improved liquid level gauging apparatus in which particularly novel means are utilized for overcoming friction which tends to retard or inhibit free movement of the tape.

Another object of the invention is to provide a liquid level gauging apparatus of the above character in which relatively strong recurrent vibrations can be introduced into the tape.

Another object of the invention is to provide a gauging apparatus of the above character in which the amplitude of the vibrations can be readily changed.

Another object of the invention is to provide gauging apparatus of the above character in which the means for introducing recurrent vibrations or movements into the tape is positive in operation.

Another object of the invention is to provide a gauging apparatus of the above character in which the operation of the means for inducing vibration in the tape is foolproof.

Another object of the invention is to provide a gauging apparatus of the above character which is easy and economical to manufacture.

Another object of the invention is to provide a means for inducing a recurrent vibration of the above character which can be installed on existing installations.

Additional objects and features of the invention will appear from the following description in which the preferred embodiment has been set forth in detail in conjunction with the accompanying drawing.

Referring to the drawing:

Figure 1 is a side elevational view, partly in cross-section, showing gauging apparatus incorporating the present invention.

Figure 2 is an enlarged cross-sectional view taken along the line 2—2 of Figure 3 of the motion inducing apparatus utilized in the gauging apparatus shown in Figure 1.

Figure 3 is a cross-sectional view taken along the line 3—3 of Figure 2.

Figure 4 is a cross-sectional view taken along the line 4—4 of Figure 2.

Figure 5 is an enlarged view partly in cross-section of the eccentric member and annular member shown in Figure 3.

Figure 6 is a cross-sectional view taken along the line 6—6 of Figure 5.

In general, the present invention consists of a liquid level gauging apparatus in which particularly novel means is utilized for inducing movement in the tape to overcome the effect of friction which tends to retard movement of the elongate element. The particularly novel means includes a rotatable eccentric member which serves to swing an annular member mounted thereon in a circular path to recurrently strike the elongate element to introduce therein vibratory movement which overcomes the effect of the friction tending to retard movement of the elongate element.

The gauging apparatus illustrated in Figure 1 of the drawing consists of a head assembly 11 mounted upon a bracket 12 affixed to the side of a tank 13. The head assembly includes reeling means 14 upon which the metal gauging tape 16 or like elongate flexible gauging element is reeled. The tape is secured to a weight which in this instance has been shown to be a float 17 disposed within the tank 13. Guide means 18 serves to guide the tape 16 between the float and the reeling means 14. Motion inducing means 19 is mounted above the head assembly 11 for inducing the current movements in the tape to nullify the effect of friction upon movement of the tape introduced by the guide means 18 and the rotating parts of the head assembly 11.

The reeling means 14 includes a reel or tape drum 22 upon which the tape 16 is adapted to be reeled. The tape passes upwardly from the reel 22 and into the motion inducing means 19 after which it passes through the guide means 18 and down into the tank 13 where it is connected to the float 17. The guide means consists of vertical runs of pipes 23 and 24 and a horizontal run of pipe 26. The guide means also includes direction changing means consisting of sheave assemblies 27 and 28 which include rotatably mounted pulleys or sheaves 29 which are engaged by the tape. The float 17 is guided in its vertical movement by guide wires 31 and 32.

The operation of the head assembly 11 in conjunction with a change of liquid level 33 in the tank 13 is well known to those skilled in the art and will not be described in detail. However, as pointed out in my co-pending application, Serial No. 705,203, filed December 26, 1957, any friction encountered in the direction changing assemblies 27 and 28 and in the head assembly 11 as well as any frictional engagement of the tape with the pipe sections will tend to retard movement of the tape and the float 17 upon a change in liquid level in the tank 13. This is true because before any change in the positioning of the tape 16 can occur, the force on the float or created by the float must be sufficient to overcome the friction imparted by these elements. This friction tends to increase with continued use of the apparatus because of corrosion, gumming and the like, of the parts.

As explained in the above co-pending application, to overcome or nullify the effects of such friction, it has been found desirable to utilize motion inducing means which serves to induce recurrent vibratory movement into the tape.

The motion inducing means 19 which has been found to be particularly satisfactory is shown in detail in Figures 2 through 6. The motion inducing means consists of a base 34 upon which are mounted eccentric drive means 36 and motive means 37. The base is formed with a pair of circular plate-like portions 38 and 39 which are joined by a substantially U-shaped portion 41. A shaft 42 is rotatably carried by a bearing 43 provided in the plate portion 39 and a bearing 44 carried by a bushing 46 in base plate portion 38. Washers 47 of a suitable material such as felt are mounted on the shaft adjacent the bearings 43 and 44 and are held in place by retaining washers 48 yieldably held in position by a retainer spring 49.

The eccentric drive means 36 is disposed on the end of the shaft 42 which extends through the base plate portion 38. As shown, the eccentric drive means consists of an eccentric drive hub 52 which is fixed to the shaft 42 by suitable means such as a set screw 53. An eccentric member in the form of a drive pulley 54 is mounted off center on the shaft 42 as shown and is affixed to the hub 52 by suitable means such as screws 56. A pair of circular guide members 57 and 58 are mounted on opposite sides of the eccentric pulley 54 on the shaft 42 and also are mounted off center in the same manner as the pulley 54. As will be noted from the drawing, the guide members 57 and 58 have a diameter which is substantially greater than the diameter of the pulley 54. The guide members 57 and 58 are also secured to the hub 52 by the screws 56. The pulley 54 is provided with a groove 59 which has straight inclined side walls and a flat bottom wall as shown particularly in Figure 6, for a purpose hereinafter described.

An annular member or ring 61 is mounted on the eccentric member 54 between the guide members 57 and 58. The annular member is provided with tapered side walls 62 and a flat inner surface 63 which will cooperatively seat within the groove 59 in the pulley 54. The opening 64 in the annular member is such that it has a diameter which is slightly less than the diameters of the guide members 57 and 58 so that the annular member cannot accidentally fall off the eccentric pulley 54.

The eccentric drive means is enclosed within a housing 66 which is mounted on the base plate portion 38 by suitable means such as bolts 67. As shown, the tape 16 extends through the housing 66. The housing is positioned in such a manner that the eccentric drive means within the housing has its axis parallel to the flat side or transverse axis of the tape. Stop or limiting means consisting of pins 68 and 69 are mounted in the housing on the side of the tape 16 opposite the side on which the eccentric member 54 and the annular member are mounted. The tape 16 is also spaced from the eccentric drive means and from the pins 68 and 69 so that when the eccentric drive means is not in operation, the tape does not engage the eccentric drive means or the pins 68 and 69 so that the tape can move freely. The housing 66 is provided with an access cover plate 70 to permit access to the eccentric drive means.

The motive means 37 utilized for driving the eccentric drive means consists of a motor 71 which is affixed to a mounting plate 72 by suitable means such as screws 73. The mounting plate 72 is affixed to the base plate portion 39 by screws 74. The motor 71 is provided with an output shaft 76 which is connected to one side of a coupling 77, the other side of which is connected to the end of the shaft 42 which extends through the base plate portion 39. A motor control relay 81 is mounted on the base plate portion 39 by a bracket 82. Suitable means in the form of a cover 83 is threadedly mounted on the base portion 39 to provide an explosion proof housing for the motor 71 and the relay 81.

A terminal block 84 is provided on the mounting plate 72 to facilitate electrical connections. The base 34 is provided with an outlet 86 through which electrical connections can be made to the terminal block 84, the relay 81 and the motor 71.

Operation of the apparatus may now be briefly described as follows: Let it be assumed that it is desired to take a reading of the liquid level in tank 13. Before taking the reading, the motor 71 is energized which through the shaft 42 causes rotation of the eccentric member 54. As the eccentric member 54 is rotated rapidly, the annular member or ring is swung about the eccentric member 54 and has its outer periphery traveling in a circular path which has a diameter which is substantially greater than the diameter of the annular member itself. In each revolution of the annular member 61, it strikes the tape 16 to move a portion thereof out of its normal straight line condition into engagement with the stop means consisting of pins 68 and 69 to thereby induce recurrent movements into the tape. These movements or vibrations are transmitted along the length of the tape in both directions from the point of contact with the annular member 61. These vibrations or movements are very similar to that type disclosed in my co-pending application Serial No. 705,203, filed on December 26, 1957. As explained in that application, these recurrent movements or vibrations in the tape cause the float 17 to seek its true position in the liquid 33 and to properly position the tape so that a correct readout is obtained even though considerable friction may be present in the guide means for the tape and the rotating elements in the head assembly. This has been found to be true because the vibrating tape actually jumps over the sheaves 29 in the sheave assemblies 27 and 28 and, therefore, any friction which tends to prevent rotation of the sheaves does not effect the proper positioning of the tape. The same is true with regard to the rotating parts in the head assembly 11 and with respect to any frictional engagement of the tape with the pipes 23, 24 and 26.

After recurrent movements have been introduced into the tape for a sufficient period of time to permit the float 17 and the tape 16 connected thereto to seek their proper positions, the motor 71 can be deenergized to stop rotation of the shaft 42 and eccentric member 54. The annular member 61 then drops to its normal at-rest position shown in Figure 3. With the annular member 61 in this position, no portion of the motion inducing means 19 is in contact with the tape 16 and for that reason when the motion inducing means is not energized, the motion inducing means has no effect upon the positioning of the tape 16. The tape is also out of engagement with the pins 68 and 69.

The vibrations or recurrent movements set up in the tape 16 will damp out very rapidly after the motor has been deenergized after which a reading may be made.

By way of example, in one embodiment of my invention, the eccentric member 54 was operated at a speed of approximately 1400 r.p.m.'s to cause the annular member 61 to rotate at approximately 1400 r.p.m.'s and to cause recurrent movements or vibrations to be introduced into the tape 16 at the rate of approximately 23 cycles per second.

It is apparent that the rate at which the vibrations are introduced into the tape can be readily changed by varying the speed of rotation of the eccentric member 54. The amplitude of the vibrations or recurrent movements introduced into the tape 16 can also be readily changed by varying the mass and the diameter of the annular member 61. The motion inducing means 19 may be operated locally or remotely through the relay 81 so that remote reading apparatus may be utilized if desired.

It is apparent from the foregoing that I have provided a new and improved type of gauging apparatus in which the friction in the apparatus is overcome by particularly novel means so that accurate readings may be obtained at all times. The apparatus is easy and economical to manufacture and is relatively foolproof in operation. The motion inducing means when not in operation does not interfere with the positioning of the tape. It is of a type which can be installed on existing gauging installations if desired.

I claim:

1. In a liquid level gauging apparatus, a movable elongate flexible element adapted to be positioned in accordance with the liquid level, guide means engaging the element and guiding the same, said guide means being characterized by introducing friction tending to retard movement of said element, an eccentric member having a predetermined size, means for rotating said eccentric member, and an annular member disposed on said eccentric member and having a size such that the inner dimensions are substantially greater than the size of the eccentric member whereby as the eccentric member is rotated said annular member will be swung in a substantially circular path, said eccentric member and said annular member being positioned so that as the annular member is swung in its substantially circular path, the annular member will recurrently strike the elongate element to introduce recurrent movements or vibrations into the elongate element, said annular member dropping into a position out of engagement with the elongate element when said eccentric member is stationary.

2. A liquid level gauging apparatus as in claim 1 wherein said elongate element is a tape and where said eccentric member and said annular member rotate on axes which are parallel to the transverse axis of the tape so that a side surface of the tape is recurrently engaged by the annular member as the eccentric member is rotated.

3. A liquid level gauging apparatus as in claim 1 wherein said eccentric member is provided with guide members on opposite sides of said annular member, said guide members having a size greater than the inner dimensions of the annular member to prevent accidental dislodgment of the annular member.

4. A liquid level gauging apparatus as in claim 1 together with stop means positioned on the side of said elongate flexible element opposite the side on which the eccentric member and the annular member are positioned, said stop means being engaged by said element as the element is struck by the annular member and being positioned so that the element in its normal path of travel is out of engagement with the same.

5. In a liquid level gauging apparatus, a movable elongate flexible element adapted to be positioned in accordance with the liquid level, guide means engaging the element and guiding the same, said guide means being characterized by introducing friction tending to retard movement of said element, an eccentric member having a predetermined diameter, means for rotating said eccentric member, an annular member disposed on said eccentric member and having an inner diameter which is substantially greater than the diameter of the eccentric member, said eccentric member and said annular member being positioned on one side of the elongate element, and stop means positioned on the other side of the elongate element so that as the eccentric member is rotated said annular member will be swung in a circular path to strike the elongate element and to move the same into engagement with said stop means to thereby induce recurrent movements or vibrations into the elongate element, said annular element dropping into a position when said eccentric member is stationary which is out of engagement with said elongate element, said elongate element normally traveling in a path which is out of engagement with said stop means.

6. A liquid level gauging apparatus as in claim 5 wherein the portion of said elongate flexible element engaged by the annular ring is substantially vertical and wherein said stop means are positioned at levels above and below said eccentric member and said annular member.

No references cited.